W. L. LOGAN.
AUTOMATIC ADJUSTABLE CULTIVATOR.
APPLICATION FILED JULY 22, 1909.
938,391.
Patented Oct. 26, 1909.
2 SHEETS—SHEET 1.
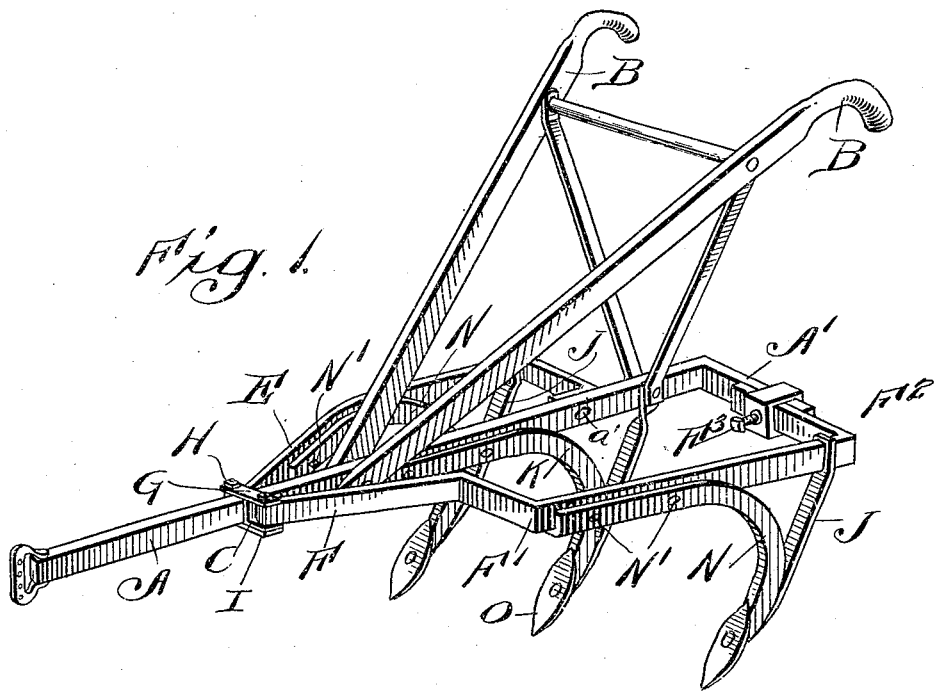
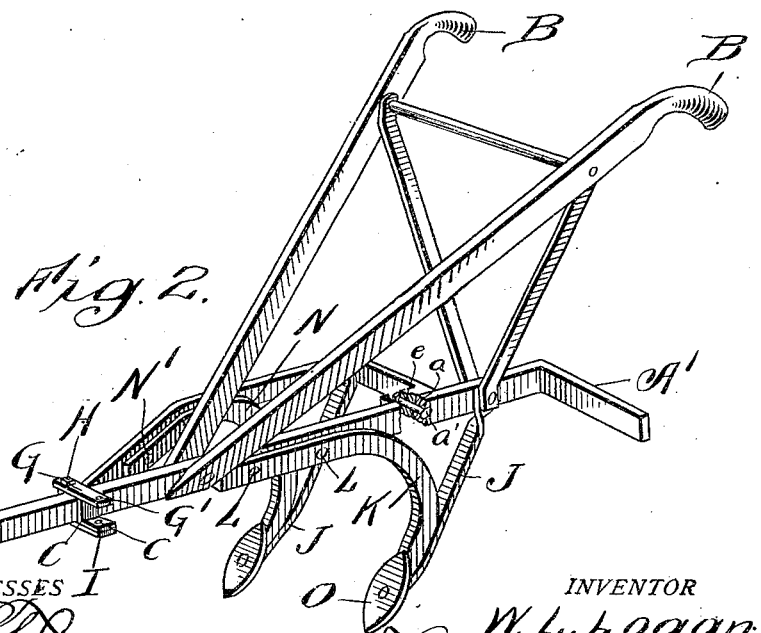
WITNESSES
INVENTOR
W. L. Logan
By Franklin N. Hoyt
Attorney

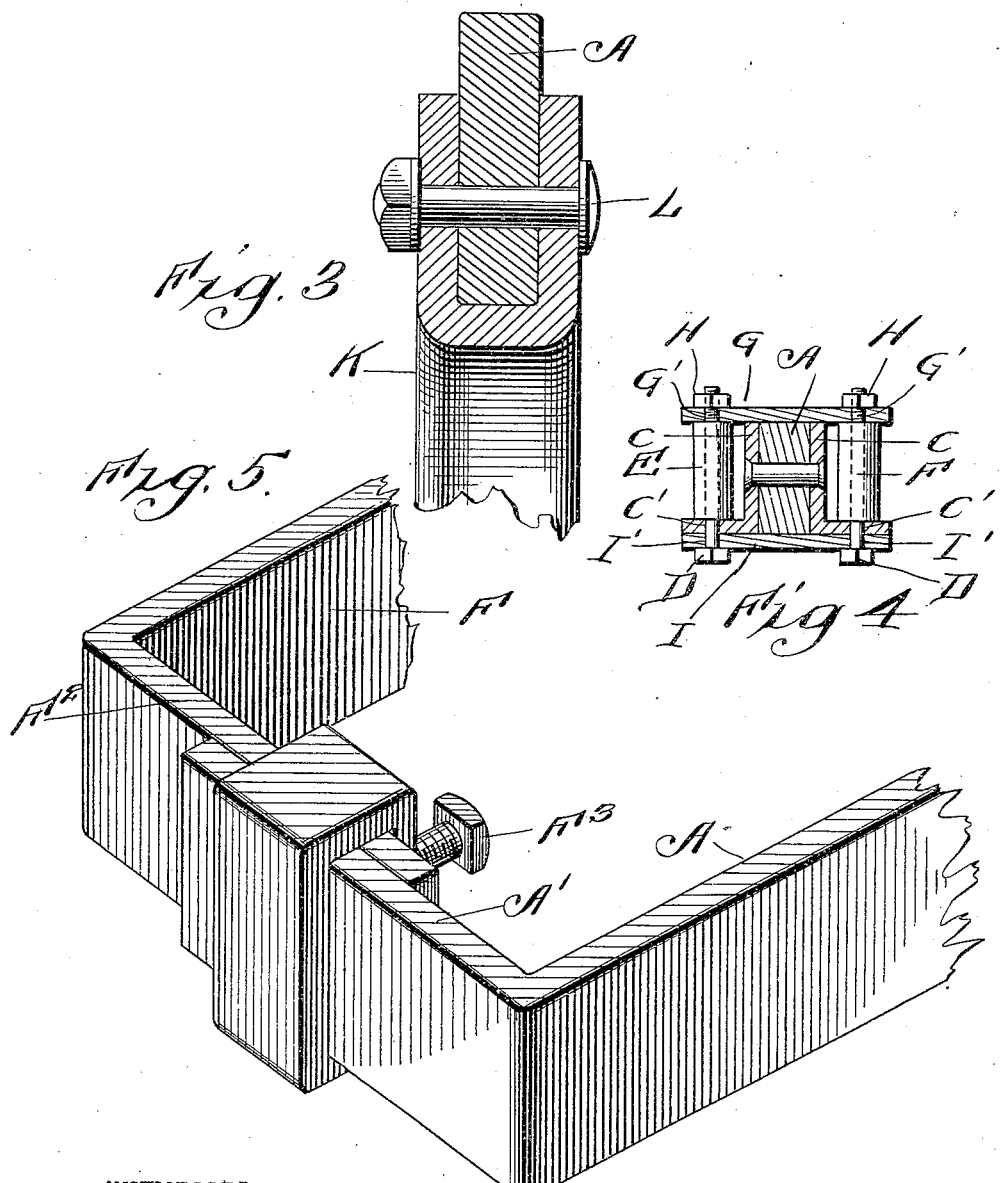

UNITED STATES PATENT OFFICE.

WILLIAM LEWIS LOGAN, OF COILA, MISSISSIPPI.

AUTOMATIC ADJUSTABLE CULTIVATOR.

938,391.　　　　Specification of Letters Patent.　　Patented Oct. 26, 1909.

Application filed July 22, 1909.　Serial No. 508,939.

*To all whom it may concern:*

Be it known that I, WILLIAM LEWIS LOGAN, a citizen of the United States, residing at Coila, in the county of Carroll and State of Mississippi, have invented certain new and useful Improvements in Automatic Adjustable Cultivators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in adjustable cultivator plows and comprises means whereby a plurality of plows may be adjusted and held in different positions and so arranged that one or more of the plows may be removed if desired to adapt the implement for various uses.

The invention comprises various details of construction, combinations and arrangements of parts which will be hereinafter fully described and then specifically defined in the appended claims.

My invention is illustrated in the accompanying drawings, in which:—

Figure 1 is a perspective view of my improved adjustable cultivator plow. Fig. 2 is a view showing one of the plows removed. Fig. 3 is a cross sectional view through one of the plow beams, and Fig. 4 is a detail view showing the adjustment of the beams.

Reference now being had to the details of the drawings by letter, A designates a plow beam which may be of any suitable material and provided with handles B which are fixed thereto and suitably braced. Fastened to the opposite sides of the plow beam are the angle plates C which are apertured as at C' for the reception of the bolts D.

E and F designate auxiliary plow beams which are pivotally mounted upon said bolts and rest upon the angle plates, as shown.

G designates a plate which is apertured as at G' and through which said bolts pass and nuts H are fitted to the threaded ends of said bolts and, when tightened, are adapted to hold the plate G against the upper edges of the two auxiliary plow beams and frictionally hold the same against the angle plates. A plate I, provided with apertures I', receives said bolts, the heads of which are adapted to hold the plate I against the under faces of the angle plates and be drawn tightly against the same when the nuts upon the bolts are tightened.

The main plow beam A is provided with a standard K, the shank portion of which is longitudinally grooved to receive said beam, and bolts L are passed through registering apertures in the shank portion of the standard and each beam to hold said standard in adjusted position. A plow O, of any size or shape, may be fastened to said standard and adjustably mounted thereon.

Upon each of the auxiliary plow beams E and F are plow carrying standards N, the shank portions of which are grooved and adapted to receive said auxiliary beams and held by means of bolts N'. Suitable braces J are fixed to each standard upon the auxiliary beam and also to the beams, thus securely bracing the standards to which they are attached and plows of any size or shape are fastened by means of bolts to the standards upon the auxiliary beams.

It will be noted upon reference to the drawings that the main plow beam has its rear end right angled, as at A', and the end of the auxiliary beam F is bent at an angle at F' and its end F² bent at right angles and provided with apertures for the reception of the bolts F³ carried by a collar which is adapted to fit over the angled ends of the beams F and A, said angled ends having registering apertures for the reception of the bolts whereby the parts may be held in adjusted positions accordingly as it may be desired to hold the auxiliary beams so that the plows will cut into furrows at different distances apart.

The auxiliary beam E has its end L-shaped with an aperture $e$ in one end adapted to register with an aperture $a$ in the frame A and a bolt $a'$ is adapted to pass through the registering apertures in said frames A and E whereby said frame E may be held in a fixed position.

After the plows are fastened in adjusted positions, the nuts on the bolts at the pivotal ends of the auxiliary beam may be tightened and the angle and clamping plates held frictionally against the opposite edges of the auxiliary beams. In the event of it being desired to utilize but two of the plows, one or the other of the auxiliary beams may be readily removed.

From the foregoing, it will be noted that, by the provision of a cultivator plow embodying the features of my invention, an implement is provided especially adapted for plowing young cotton plants or vegetables, making it possible for the plows to loosen the ground near the plant and also intermediate the rows and without covering or breaking up the cotton or other plants and, if desired, one or more or both of the auxiliary plows may be removed and a scooter plow attached to the handle which is fixed to the central plow beam.

What I claim to be new is:—

1. An adjustable cultivator for plows, comprising a central plow beam having its rear end bent at right angles, handles upon said beam, auxiliary angled plow beams pivotally connected at their forward ends to the handle carrying beam, the end of one of said auxiliary beams being fixed to the central plow beam and the other auxiliary plow beam adjustably connected to the right angled end of the central plow beam, channeled plow carrying standards engaging said plow beams and suitably braced, as set forth.

2. An adjustable cultivator for plows, comprising a central plow beam having its rear end bent at right angles, handles upon said beam, parallel plates engaging the upper and lower edges of the central plow beam, angled plates intermediate said parallel plates, fastening means passing through registering apertures in said angled plates and central plow beam, bolts passing through said plates and adapted to hold the same in clamping positions, auxiliary plow beams having eyes at their forward ends pivotally mounted upon said bolts and their rear ends fastened to the central plow beam, channeled plow carrying standards engaging said plow beams, and plows fixed to said knees, as set forth.

3. An adjustable cultivator for plows, comprising a central plow beam having its rear end bent at right angles, handles upon said beam, parallel plates engaging the upper and lower edges of the central plow beam, angled plates intermediate said parallel plates, fastening means passing through registering apertures in said angled plates and central plow beams, bolts passing through said plates and adapted to hold the same in clamping positions, auxiliary plow beams having eyes at their forward ends pivotally mounted upon said bolts and their rear ends angled, one of which is fixed to the central plow beam and the other end having a sliding adjustable connection with the angled end of the central beam, a strap passing about the adjustable ends of said beams, and set screws for holding the latter in adjusted positions, as set forth.

In testimony whereof I hereunto affix my signature in the presence of two witnesses.

WILLIAM LEWIS LOGAN.

Witnesses:
JAMES B. McBRIDE,
CALEB V. McDOUGAL.